United States Patent
Wolas-Shiva et al.

(10) Patent No.: US 7,788,267 B2
(45) Date of Patent: Aug. 31, 2010

(54) IMAGE METADATA ACTION TAGGING

(75) Inventors: Claudine Melissa Wolas-Shiva, Los Angeles, CA (US); Fumio Nagasaka, Ueda (JP)

(73) Assignee: Seiko Epson Corporation, Tokyo (JP)

( * ) Notice: Subject to any disclaimer, the term of this patent is extended or adjusted under 35 U.S.C. 154(b) by 285 days.

(21) Appl. No.: 11/679,111

(22) Filed: Feb. 26, 2007

(65) Prior Publication Data
US 2008/0208922 A1    Aug. 28, 2008

(51) Int. Cl.
G06F 17/30    (2006.01)
(52) U.S. Cl. ................................ 707/748; 707/688
(58) Field of Classification Search ............ 707/688, 707/748
See application file for complete search history.

(56) References Cited

U.S. PATENT DOCUMENTS

| | | | |
|---|---|---|---|
| 6,055,543 A * | 4/2000 | Christensen et al. ..... | 707/104.1 |
| 2002/0075322 A1 | 6/2002 | Rosenzweig et al. | |
| 2002/0140843 A1 | 10/2002 | Tretter et al. | |
| 2003/0033296 A1 | 2/2003 | Rothmuller et al. | |
| 2005/0165782 A1* | 7/2005 | Yamamoto ...................... | 707/7 |
| 2005/0177568 A1* | 8/2005 | Diamond et al. ............... | 707/5 |
| 2006/0015524 A1* | 1/2006 | Gardiner et al. ............. | 707/102 |
| 2006/0074883 A1* | 4/2006 | Teevan et al. .................. | 707/3 |
| 2006/0294100 A1* | 12/2006 | Meyerzon et al. .............. | 707/7 |
| 2007/0036444 A1* | 2/2007 | Yoshida ...................... | 382/232 |

(Continued)

FOREIGN PATENT DOCUMENTS

WO    WO 02/057959    7/2002

(Continued)

OTHER PUBLICATIONS

Hunter, Jane; Zhan, Zhimin. "An Indexing and Querying System for Online Images Based on the PNG Format and Embedded Metadata" in: ARLIS/ANZ Conference.Sep. 1999. Brisbane, Australia. URL http://archive.dstc.edu.au/RDU/staff/jane-hunter/PNG/paper.html.*

(Continued)

Primary Examiner—Mohammad Ali
Assistant Examiner—Amanda Willis
(74) Attorney, Agent, or Firm—Workman Nydegger

(57) ABSTRACT

Data files are action tagged by electronic devices as the files are used, and such tags are used to compute a total value for each data file among a group of data files for the purpose of running comparative-type operations, e.g., sorting or organizing the group of data files, or searching for one or more files in the group. The action tags are carried on each data file, preferably in the header, so as to travel with the file as the file is transferred among devices. The action tagging generally involves tracking, and storing as metadata in the data file, each occurrence of each of multiple indirect actions, and one or more characteristics associated with each indirect action occurrence. In setting up a comparative-type operation, a user can select via an interface one or more parameters with which to constrain each input value computation for respective indirect activities. A user-selected weight can be assigned to each input calculation. Embodiments of the invention and/or aspects thereof can be realized in methods, instruction-containing mediums, data structures, devices and systems.

15 Claims, 9 Drawing Sheets

U.S. PATENT DOCUMENTS

| | | | |
|---|---|---|---|
| 2007/0094257 A1* | 4/2007 | Lankford | 707/7 |
| 2007/0226213 A1* | 9/2007 | Al-Masri | 707/7 |
| 2007/0244867 A1* | 10/2007 | Malandain et al. | 707/3 |
| 2008/0155465 A1* | 6/2008 | Fu et al. | 715/803 |
| 2008/0201299 A1* | 8/2008 | Lehikoinen et al. | 707/3 |
| 2008/0229099 A1* | 9/2008 | Kim et al. | 713/160 |

FOREIGN PATENT DOCUMENTS

WO     WO 02/082328     10/2002

OTHER PUBLICATIONS

Yves Lafon and Bert Bos, "Describing and retrieving photos using RDF and HTTP", at http://www.w3.org/TR/photo-rdf/ Date of first publication unknown.

* cited by examiner

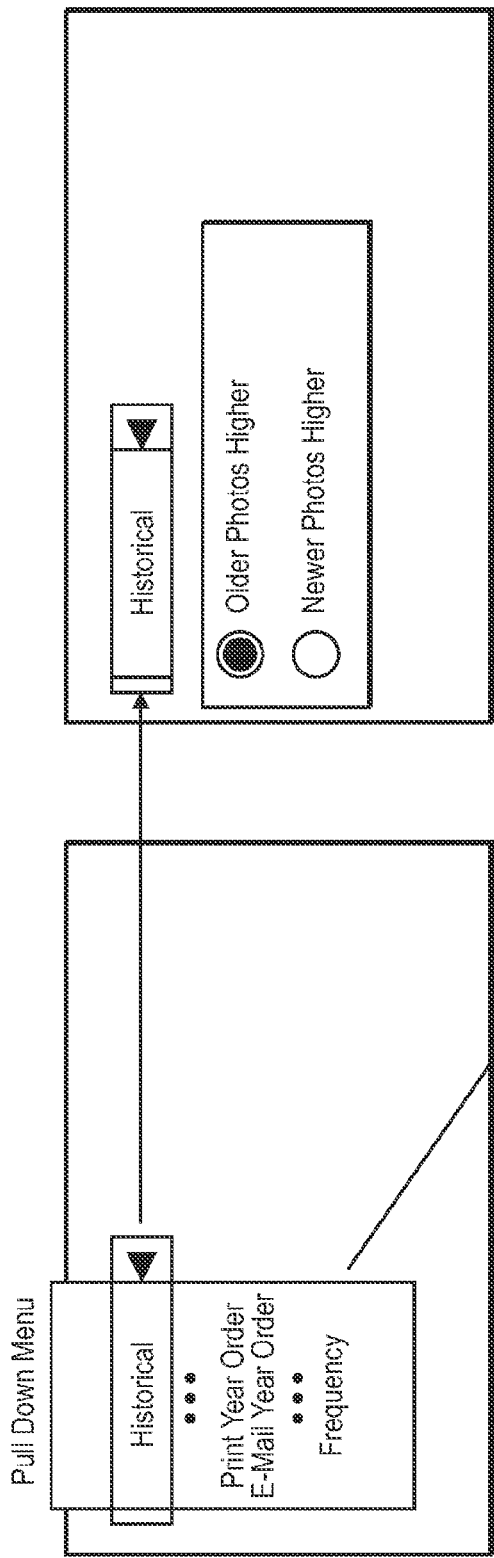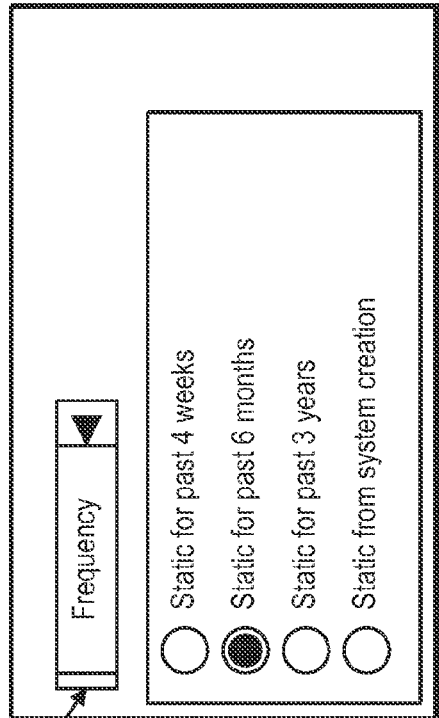

| Label Of Action | Occurrences | The Last Updated Date | Device Type |
|---|---|---|---|
| Print | 16 | 23.01.2007 | 3 |
| E-mail | 12 | 12.01.2007 | 2 |
| Back up done | 12 | 12.01.2007 | 2 |
| Viewing | 4 | 05.12.2006 | 1 |
| ⋮ | | | |

Address In RAM (left label); 1201 (right bracket)

*Fig. 12*

| Device Type | |
|---|---|
| PC, Computer | 1 |
| Printer | 2 |
| Photo Viewer | 3 |
| Cell Phone | 4 |
| Digital TV | 5 |

*Fig. 13*

IMAGE METADATA ACTION TAGGING

CROSS-REFERENCE TO RELATED APPLICATIONS

Not applicable.

BACKGROUND

Digital data comes in a variety of forms including audio, video, and imagery, and the amount of such data that can be accessed over networks or that is stored continues to grow exponentially. This is particularly true in the case of digital imagery where digital image capture and storage devices are becoming pervasive in many aspects of our daily lives. As a result of this trend, several issues have arisen including how to organize and retrieve image files readily, efficiently, and economically.

Currently, image files typically include a file header, attribute tags, and image data. These conventional attribute tags include attribute information describing the image according to various standards. Attribute tags can relate to image data structure, data characteristics, image title, date of creation, make and model of the capture device, software used, copyright holder, and artist, for example. Various tags have also been associated with image files within image management software applications using pointers. These types of attribute tags can be searched for or otherwise used to organize image files only inside the particular application with which the files are associated. Tags and pointers have also been generated using software and information input by a user via a graphical user interface. These tags are specifically generated and intended by the user to label the file for future use.

However, as the volume of digital imagery increases and as image file sizes becomes larger, image organization and the ability to locate a particular digital image file become increasingly difficult. Conventional attribute tags often do not provide sufficient distinction among image files such that a user can readily identify image files of interest, or organize the files in a certain way. Tags associated with other types of data files likewise do not provide the level of distinction needed for more sophisticated searching and organization operations. Also, user-generated tags are problematic, as many users have neither the time nor the desire to specifically label data files but still want to be able to search and organize the files.

Attribute tagging designed for a closed system also imposes significant limitations in the search for or transfer of data files between devices and among different environments. Such system often provides an application-specific data file to facilitate the performance of customized actions. For example, an audio-file-based system may provide a user with his/her favorite songs based on a static count of the number of times the user has recently listened to each song. Typically, such information along with user settings are stored in a separate file, which is kept in a separate directory. However, once the user moves the audio data to another system including moving to a CD/DVD for purposes of backup, the link to the separate file, which is usually not transferred, is lost, creating a dangling bond that is not used anymore. This problem also arises if a user accesses his/her files outside the associated application.

As such, there is a need for improved methods for managing digital files including digital images.

BRIEF SUMMARY OF SEVERAL EXAMPLE EMBODIMENTS

These and other limitations are overcome by embodiments of the invention, which relate to systems and methods for managing digital data, including audio, video, photos, images, etc. Each data file includes a header and content data. Action tags, which track use actions taken with respect to a particular data file, are also included on that data file, preferably in the header, as metadata. The metadata, when used in accordance with principles of the invention, improves the ability to manage the data files, including organizing or sorting a large group of data files in a particular way, or finding one or more specific files among a large group of files.

In one aspect of the invention, a method for computing a total value of a data file is provided. The method initially comprises tracking, and storing as metadata in the data file, each occurrence and at least one associated characteristic of each of a plurality of indirect actions taken with respect to the data file. Then, at least two input values, one for each of at least two of the plurality of indirect actions, is computed. Each input value is computed as a function of at least one parameter. A total value for the digital file is then computed based on the input values.

In another aspect, a system for managing data files includes an interface and a processor. The interface enables a user to set one or more parameters for conducting a comparative-type analysis on the data files, based on action tags carried on the data files. That is, a user may set the parameters to search for a particular file, or to organize or sort the files in a certain way. To this end, the parameters may be set so as to apply to multiple indirect actions, or may be set specifically for any particular indirect action, depending on what the user is trying to accomplish. The processor of the system is configured to compute, for each file, at least two input values, one for each of at least two of the plurality of indirect actions, based on the action tag information on that file and the parameters set by the user for that particular comparative-type operation. The processor is further configured to compute a total value for each data file based on the input values computed for that file.

These and other features of the present invention will become more fully apparent from the following description and appended claims, or may be learned by the practice of the invention as set forth hereinafter.

BRIEF DESCRIPTION OF THE DRAWINGS

To further clarify the above and other features of the present invention, a more particular description of the invention will be rendered with reference to specific embodiments thereof, which are illustrated in the appended drawings. These drawings depict only typical embodiments of the invention and are therefore not to be considered limiting of its scope. The invention will be described and explained with additional specificity and detail through the use of the accompanying drawings in which:

FIGS. 4-6 illustrate different shots of an exemplary user interface for defining organization, sort, search or access schemes for managing action tagged image files;

FIG. 12 illustrates a priority table for use in priority synchronization.

FIG. 13 illustrates a table listing device types and corresponding identifiers.

DETAILED DESCRIPTION OF SEVERAL EMBODIMENTS

Figure 1:
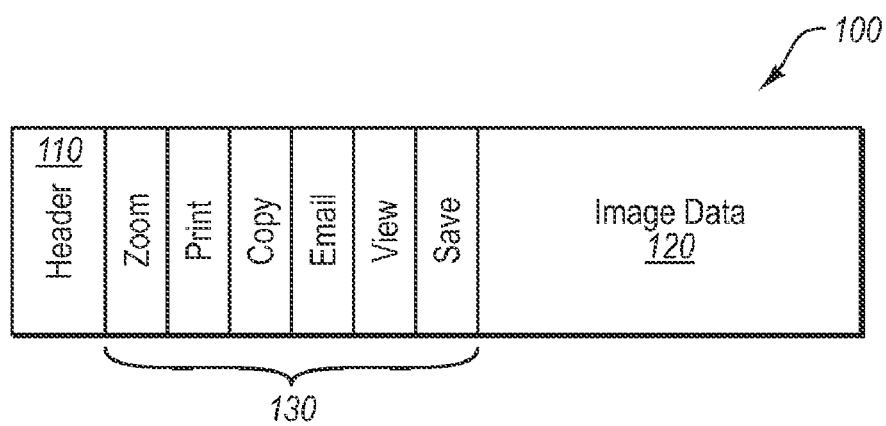
FIGS. 1-3 illustrate embodiments of image files that include metadata associated with indirect user actions.

Principles, as well as a description of the structure and operation of several embodiments, of the invention are presented herein. It should be understood that the drawings are diagrammatic and schematic representations of such embodiments and, accordingly, do not limit the scope of the present invention; nor are the drawings necessarily drawn to scale. Well-known devices and processes have been excluded so as not to obscure the discussion in details that are known to one of ordinary skill in the art.

Embodiments of the present invention relate to various types of files that contain content, such as video, audio, and/or image including photo data, and also information indicative of how the particular file has been used. This information may be in the form of metadata (also referred to herein as "tags," "action tags," or the like). The metadata of a particular file is indicative of occurrences of each of multiple indirect actions taken with respect to that file. The present invention further relates to methods and algorithms for performing comparative-type analyses on such tagged files. A comparative-type analysis in accordance with aspects of the invention may be used to rank, sort or organize files, or search for one or more particular files, according to any of a wide variety of criteria, which may be user-defined. The richness, variety and depth of the analyses that can be performed with respect to a group of data files based on the indirect tagging action will become apparent to those skilled in the art in light of the present disclosure. While the illustrated embodiments are directed to image files, the invention is not so limited. Principles of the invention also apply to files containing other content, and such files and comparative-type analyses performed thereon are also included within the scope of the invention.

As referred to herein, an indirect action relates to a type of action taken on a digital file by a user manipulating the file via a software application and/or a device, such as a printer or computer, or by the device itself (in performing certain automated operations), the primary purpose of which is not to create a tag or otherwise generate stored information describing the action taken on the data file, but rather to take the action itself. Therefore, the reference to "indirect" is from the perspective of the generated tag. By generating a tag to record each occurrence of each of multiple indirect actions taken with respect to the data file, the need for a dedicated tag generator/editor is eliminated. The tagging of an image file in such a "behind-the-scene" manner can be done in any number of ways, including adding a new tag representative of the occurrence, or modification of an existing tag indicative of the particular indirect action.

One purpose for which the action tags can be used is for locating one or more particular image files. For example, a user may be interested in locating an image file that was acted upon by a particular operating device, standalone or otherwise, on a particular date. According to embodiments of the invention, metadata or a tag was incorporated into the image file by the operating device when it acted on the file on the date in question. As a result, the metadata of that image file reflects this use, and that metadata stays with the image file even if it is transferred between various devices and memory mediums thereafter. Thus, the user can quickly locate that image file from among other image files by running a comparative-type analysis program configured to analyze the files for those containing metadata indicative of a particular use, and retrieve the file(s) satisfying that use criteria.

Another purpose for which the action tags can be used is for organizing image files. For example, in the case of a database that includes many image files, the image files can be organized within the database, or associated with an organization scheme, based at least in part on the action tags within the image files. A comparative-type analysis program can be configured according to a desired organization scheme, and then run, the result of which will be a return of the image file(s) or some indication thereof that satisfy the criteria of the organization scheme. Multiple analyses can be run, each with a different configuration, to group image files in a particular way. Configuration of the comparative-type analysis program to look for files having one or more specified action tags can be done based on user-set parameters, as will be further explained, or based on a preset configuration.

In one embodiment, each occurrence and at least one associated characteristic of each of multiple indirect actions taken with respect to an image file are recorded on the file. The indirect actions for which occurrences are tracked and recorded can include, without limitation, printing, copying, zooming, sending by email, receiving by email, viewing, saving, editing, enhancing, etc. An associated characteristic can be, without limitation, the date of the indirect action occurrence, the device that performed that occurrence, or the person operating that device or associated device, e.g., a computer in communication with a printer. Parameters act as queries to define one or more of the indirect actions of interest, e.g., all image files printed in a certain time period, or all image files on which any indirect action was taken during a certain time period. Weights can also be used, for example, to prioritize indirect actions relative to each other, and thus can be used as further criteria for a search or organization scheme. Weights may be used to rank or sort files that are returned from a particular analysis in order of importance. For example, in a case in which parameters are set to obtain all images on which any of several indirect actions was taken during a certain time period, the user may wish to weight occurrences of one type of action higher than occurrences of another type of action for purposes of ranking or sorting the image files returned by that query. As an example, a print occurrence within the defined time period can be weighted higher than a view occurrence during that time period. So, in that case, of the files returned, a file in which the only action taken was three print occurrences would be ranked higher than a file in which the only action taken was three view occurrences. Multiple relative weightings can also be used, e.g., a print occurrence is weighted higher than a copy occurrence, which is weighted higher than a view occurrence, which is weighted higher than an email occurrence. A certain number of occurrences of a given indirect action may also be disproportionately weighted relative to the weighted sum of those occurrences, e.g., three print occurrences is weighted at 7, whereas each individual print occurrence is weighted at 2. These examples are by no means exhaustive. Indeed, those skilled in the art will appreciate that many variations along these lines are possible. The weighting can be applied in a variety of ways as well. For example, the weight(s) can be set along with the parameters, or may be incorporated in the metadata of the image file.

In addition to organizational or search related tasks, action tagging can also be used to avoid redundancy. For example, action tagging can help manage standalone backup solutions. For example, in the case of a printer with integrated CD burner that enables a user to backup directly from memory cards to CDs or DVDs, if an image file has already been backed-up, then an action tag can be added to the file's metadata indicating the backup. Thus, the backup of the image file, which is an indirect action that may in addition be self-executing, is recorded as metadata to reflect that the image file has been backed up.

Any indirect action taken on a data file by an electronic device can generate or modify one or more action tags according to the teachings herein. Advantageously, generation or modification of an action tag does not require user input; rather, each action tag is automatically generated or modified by an electronic device in response to an occurrence of an indirect action. Such action tagging can be carried out by software, firmware, or other suitable means.

Examples of electronic devices that can be used to generate or modify action tags include printers, scanners, cameras, photo viewers, cell phones, presentation devices, personal digital assistants, conventional and special purpose computers, any device including a print driver, and other standalone electronic devices or any combination thereof. Because the action tags are incorporated directly into the image files, as metadata for example, the action tags become an integral part of the image file. When the image file is moved from one electronic device or storage medium to another electronic device or storage medium, the action tags are transferred along with the image file because the action tags are part of the image file. Therefore, the action tagging is not necessarily application or device specific. Rather, action tagging can be done in many different applications and by many different types of devices to record the action history of each file.

Thus, in the backup example, if the user removes a memory device, adds additional image files to the memory device, and reinserts the memory device into the standalone device, the standalone device will be able to identify those image files that have already been backed up and those that have not by analyzing applicable metadata within the image files. This will stop the device from performing redundant or duplicate back-up processes for those image files that have already been backed up. Similarly, action tagging and analysis of such tags can be used to prevent redundant printing, saving, loss of image files due to mistaken deletion, as well as to provide other benefits.

Referring to FIG. 1, an example of an image file 100 is illustrated. The image file 100 includes a header 110 and image data 120. The image file 100 can also include other fields, tags, and data according to any number of image file format standards. The image file 100 includes a plurality of action tags 130, which can be separate from the header 110 or preferably a part thereof. The tags 130 are inserted into the image file 100 or incorporated into existing tags when a device performs an indirect action on the image file 100. Again, the action is "indirect" from the perspective of the generated or modified tags.

For example, the image file 100 illustrated in FIG. 1 has action tags 130 that track, by way of example only, occurrences of each of the following indirect actions: zoom, print, copy, email, view, and save. Each occurrence of a particular indirect action may be tracked, for example, by insertion of an action tag into the image file 100 recording the occurrence and at least one associated characteristic, e.g., the time of the occurrence, which may be expressed in any appropriate unit of time. Other associated characteristics that may be included instead of, or in addition to, time include identification of the device or user operator performing the indirect action. With such information embedded on image file 100, it can be analyzed and/or compared to other image files for various purposes, such as those disclosed herein. For example, the image file 100 can be analyzed and/or compared to other image files to select one or more image files based on various criteria, to organize the image files based on various criteria, or to perform automated or user-defined actions using particular image files.

Figure 2:
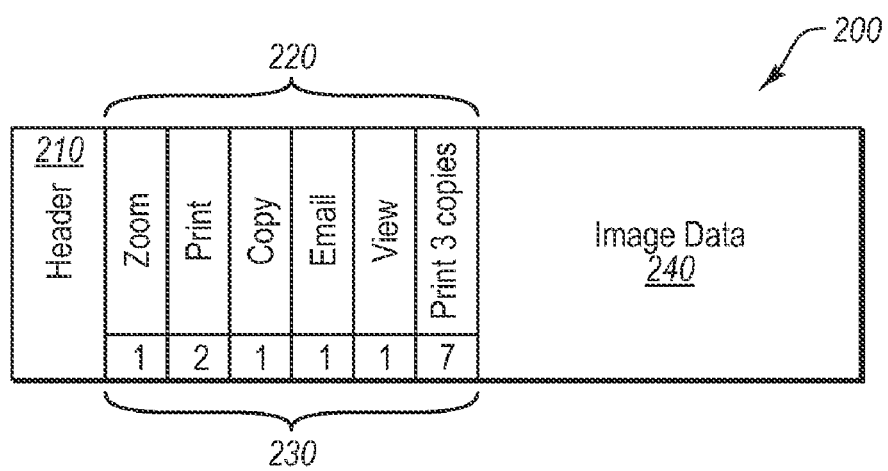

FIG. 2 illustrates another example of an image file 200. The image file 200 includes a header 210 and image data 240. The image file 200 further includes several action tags 220, which may be separate from, or part of, the header 210. Each of the action tags 220 includes information identifying occurrences of an indirect action performed with the image file 200 and one or more associated characteristics of that occurrence. For example, the Zoom tag reflects all zooming actions that were performed on the image file 200 together with a characteristic such as the corresponding dates on which the respective zoom actions were performed. In addition to the Zoom tag, the image file 200 includes Print, Copy, Email, and View action tags, and a separate action tag for 3 Print occurrences. These action tags are exemplary only; other combinations of action tags may be used.

The indirect action occurrences as reflected in the action tags 220 can be associated with weight information 230. In one embodiment, as illustrated in FIG. 2, each individual action tag may include a weight value that can be selected based on any of a variety of criteria including user-perceived importance of the occurrence of the particular indirect action. For example, a print occurrence can have a higher weight value than a copy, email, view, or zoom occurrence. Moreover, printing three or n times can be disproportionately weighted, say 7, relative to the weighted sum of three prints, say (3×2=6). In that case, the first two prints would be weighted at 2 each, whereas at the third print the higher weighting would be triggered. In the case of, say 8 prints, the total value for printing would be 18: a weight of 7 for the first three prints, a weight of 7 for the next three prints, and a value of 4 (2 each) for the next two prints. Disproportionate weighting for multiple occurrences of any of the indirect actions, as explained above with respect to printing, can be done. A cumulative or total value for the image file 200 can then be calculated, for example, by adding the weighted occurrences of the indirect actions. This cumulative total can be compared to cumulative total of other image files to select, sort, and/or organize image files, or for any other purpose.

Figure 3:
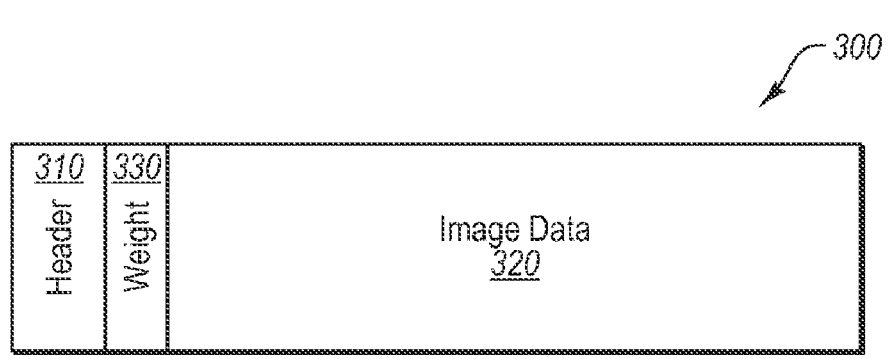

The cumulative weighted value of the indirect action occurrences can be recorded on an image file in a running manner, as shown in FIG. 3 with respect to image file 300, which includes image data 320, a header 310, and a cumulative weight action tag 330. The cumulative weight action tag 330 can be part of the header 310 or separate from the header 310. In one embodiment, each time an indirect action is performed using the image file 300 the value of the cumulative weight 330 can be modified, e.g. increased, so as to track, in a weighted manner, indirect actions performed on image file 300. The cumulative weight 330 can thus represent the running weighted sum of all, or select ones of, indirect action occurrences taken with respect to image file 300. The cumulative weight tag 300 of FIG. 3 can be combined with the action tags 220 of FIG. 2 or action tags 130 of FIG. 1 in order to provide more file management options. In one such embodiment, the cumulative weight tag 300 could serve as a preset or default criteria based on which files could be organized, while the individual action tags provide a basis for a variety of user-specified organizing or searching schemes. More generally, whether in the form of a cumulative weight or as determined from indirect action occurrences and associated weights, image file values can be analyzed and compared to select, organize or sort files based on "importance" to a particular user.

While the individual weights 230 or cumulative weight 330 add further richness, variety and precision to the types of analyses that may be performed and to the manner in which image files so tagged can be selected, organized and/or sorted, weighting is not necessary in all embodiments of the invention. Action tags without weights can be analyzed to determine whether and how many times a particular action, e.g., print, save, email, etc. has occurred. One or more characteristics associated with each occurrence, e.g., time, particular user, particular device provide further information for such analysis. Thus, in accordance with the teachings of embodiments of the present invention, an action tag can be created and/or modified for an occurrence and associated characteristic(s) of any of a variety of indirect actions, including, but not specifically limited to those described herein, providing a basis of running any of a large number of targeted comparative analyses of tagged image files to, for example, select one or more image files from a larger set, or organize or sort a set of image files. Weights 230 of individual action tags 220 provide the user with tools for more precisely specifying a particular selection or sorting scheme. For example, when a user values the occurrence of one type of action, e.g., printing, more than the occurrence of another type of action, e.g., viewing, that value difference can be reflected in the weight of the print action tag relative to the weight of the view action tag. More generally, each action tag can be assigned a weight that is indicative of the importance of the occurrence of the corresponding indirect action relative to the occurrence of any of the other indirect actions that may be performed on the tagged image file. If a particular indirect user action is not relevant to a particular search, organization, or sorting scheme, the weight of the corresponding action tag can be set to 0, or the action tag can be removed. Weighting alternatively be applied when configuring a comparative-type analysis to be run, as explained below.

Numerous combinations and variations of the teachings illustrated by the examples of FIGS. 1, 2, and 3 can be used to track and record indirect action occurrences taken with respect to an image file and to use that information for purposes file management.

Moreover, image files to which the teachings of the present invention can be applied include, but are not limited to, AGP, AI, ART, BMP, CDR, CGM, CIN, CPI, CPT, DPX, DXF, EPS, EMF, EXR, FH, FLA, FPX, GIF, IFF, ILBM, IGS, JPEG, JPG, JPG2, JP2, MNG, MYD, MYV, PBM, PCD, PCX, PDF, PGM, PICT, PCT, PIC, PNG, PPM, PS, PSD, PSP, SGI, RGB, RGBA, INT, INTA, BW, SVG, SVGZ, SWF, TIFF, TIF, TGA, WBMP, WMF, XAML, XAR, XBM, XCF, and XPM image formats, as well as different versions, e.g., thumbnail, derivations, etc. Indeed, the principles of the invention can be applied to other types of files as well, and in that sense, the schematic file representations in FIGS. 1-3 may also represent a video or audio file with a header, action tags, with or without individual weights or a cumulative weight, and video, audio, and/or text data, as the case may be. For example, when a video file is emailed, recently played, edited, copied, compressed, modified, etc., the video file can be action tagged in accordance with the principles described herein to reflect that indirect action.

Referring now to FIGS. 4, 5 and 6, schematic screen representations of an exemplary user interface by which a user can control parameters in accordance with a particular organization or search scheme is shown. The user interface may be graphical, i.e., a GUI, and include pull down menus for selection of certain conditions, e.g., historical, frequency, etc., as shown in FIG. 4. In one embodiment, once the user selects one of these conditions, a sub pane will appear presenting further options from which the user can choose to further refine that condition. For example, if the user selects "Historical," a sub pane of the type shown in FIG. 5 will appear that allows the user to specify, for example, with respect to say photos, whether older photos are more important than newer ones, or vice versa. In another example, if the user selects "Frequency," a sub pane of the type shown in FIG. 6 will appear that allows the user to specify, for example, a time frame in which photo age is considered, e.g., the past 4 weeks, the past 6 months, the past 3 years, from system creation, etc.

Figure 7:
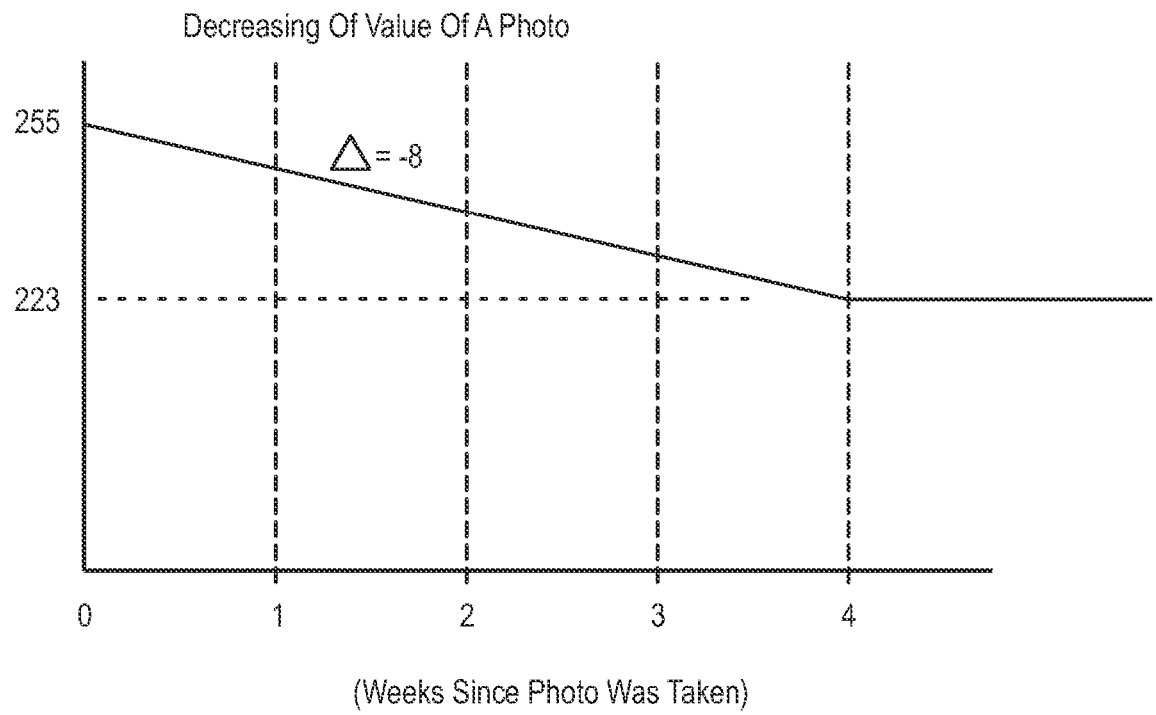
FIGS. 7 and 8 illustrate how the interface of FIGS. 4-6 can be used to dynamically control a particular indirect action based on time.

If the user selects "Newer Photos Higher" from the sub pane in FIG. 5, the comparative-type analysis program may be configured to weight the value of each photo relative to how much time has passed since it was taken. FIG. 7 shows an example of how this could be accomplished. A new photo could have a value of, say, 255. As the photo ages, its value decreases. In this example, the photo's value decreases by 8 points each week.

Figure 8:
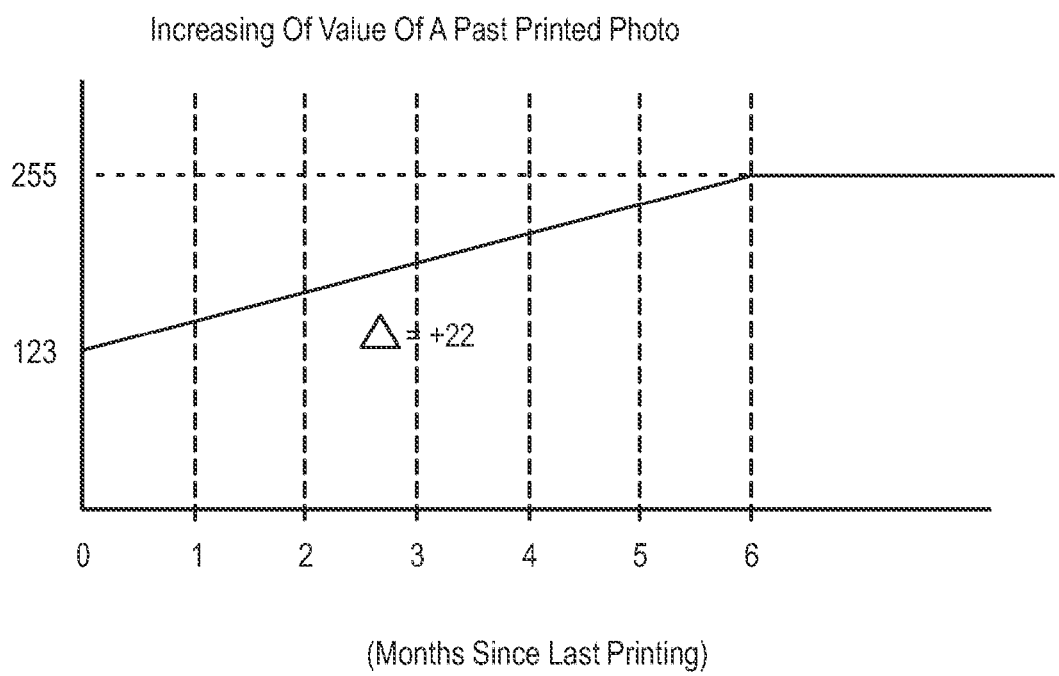

In another example, the user may configure the analysis program to increasingly weight the value of a photo as more time passes since it was last printed, up to a maximum value. In this example, a recently printed photo would start with a value of, say, 123, as shown in FIG. 8. Each month that passes in which the photo is not printed, its value increases by 22 points up to a maximum value of 255, which would be obtained when 6 months has passed in which the photo was not printed.

The type of weight prioritizing shown in FIGS. 7 and 8 can be configured at the time of analysis, or the periodic value changes could be recorded by adding appropriate metadata to the photo files, in which case a single occurrence of an indirect action, i.e., the taking of the photo or the last print occurrence, would be associated with a time decay or enhancement characteristic, which may generate multiple file taggings.

More generally, a GUI of the type shown in FIGS. 4-6, or other suitable type, may be used to select which indirect action(s) to consider for a particular search or organization scheme, and for each selected indirect action, to select associated characteristic(s) and parameter(s). In one embodiment, the total value of a digital file can be computed according to a mathematical formula of the following form.

$$\text{Total Value of Digital File} = \Sigma(\text{Indirect Action}[i](t,f,n) \times W[i]), \text{ summed for } i=0 \text{ to } N.$$

In this formula, N−1 indirect actions are selected, each of which is further defined by one or more characteristics. Each indirect action and its associated characteristic(s), designated by i, is further constrained by one or more parameters, which in the present formulation, include t which represents how long ago (measured in any appropriate unit of time, e.g., hours, days, weeks, months, etc.) since the last occurrence of that indirect action, f which represents the number of occurrences of that indirect action within a particular time frame, e.g., day, week, month, and n which represents the total number of occurrences of that indirect action. These parameters are presented by way of example only. Any suitable single parameter or combination of parameters may be used in accordance with the teachings herein. In addition, any parameter-constrained indirect action and associated characteristic(s) combination may also be weighted, if desired, as shown in the formula above. Such weighting may be in the form of a value included in the metadata that is carried on the image file, as previously explained, or a weight value may be specified by the user in configuring the analysis program. Default weight values may be carried on the file, but the analysis program may be configured to allow the user to override them by specifying different weights via the analysis program.

Figure 9:
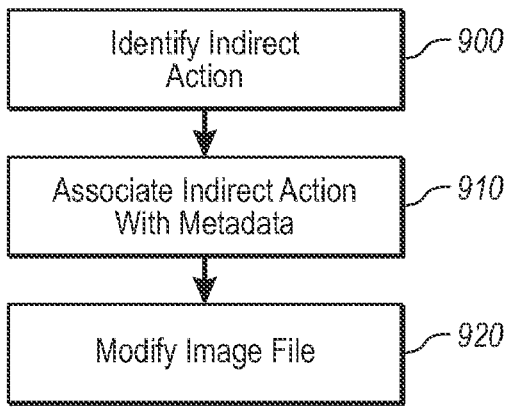
FIG. 9 is a flow diagram showing embodiments of methods of action tagging an image file.

Referring to FIG. 9, a method for tracking and storing use occurrences of an image file is illustrated. The method includes identifying an indirect action occurrence performed by a device on an image file (900). The indirect action can be any of a variety of indirect actions, as previously described. The indirect action can be a member of a set of a more general indirect action, e.g., a color print action as a subset of print actions. Other general action types, e.g., storage action type, transmission action type, access action type, or replication action type, may be further defined in this way as well.

An indirect action occurrence and at least one associated characteristic are recognized as having occurred with respect to a data file (900). That occurrence and associated characteristic(s) is associated with metadata, which may be a new action tag or an existing tag relating to that indirect action (910). The metadata on the data file is then modified to reflect the indirect action occurrence and related information (920). The modification may involve inserting new metadata or modifying existing metadata. Such metadata can also include a weight, as previously explained, if desired.

Figure 10:
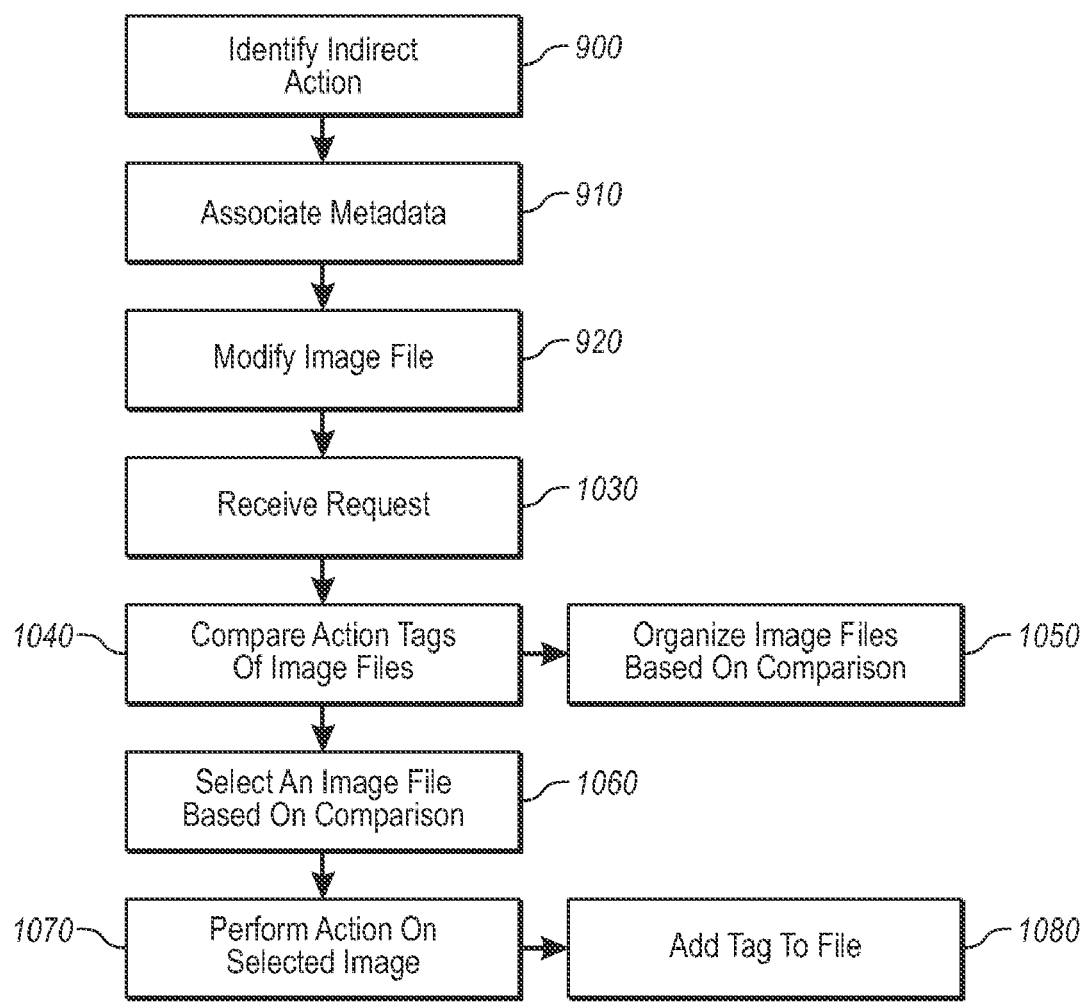
FIG. 10 is a flow diagram showing embodiments of methods for using action tagged image files.

Referring to FIG. 10, a method for using metadata tracking and storing use occurrences of individual image files is illustrated. Such metadata, with or without weights, can be added to each image file, for example, according to the method of FIG. 9 as illustrated by acts 900-920 in FIG. 10.

Having image files so tagged, a search/access, sort, organization, or other request is issued and received (1030). For example, an organization request can be a request that the image files be organized in a certain way based at least in part on the action tagging metadata stored in the image files. An access or search request can be a request for access to one or more image files based on a comparison of the action tags contained within the image files. The specific action information on which the comparison is based can be determined by a user, who can select relevant indirect action(s), associated characteristic(s), and further constrain such selection with one or more parameters, and prioritizing by adding weights if desired, as previously described. For example, a user may select input variables to find all images that have been printed in the last two weeks, and may further provide a time decay parameter to rank the images accordingly.

Relevant action tags of the image files are then compared in accordance with the specific request (1040). The action tags can be compared to identify most popular image files or image files having particular indirect actions performed in the past. The action tags can indicate a user or an electronic device performing the indirect action and this information can be compared in order to organize, identify, or otherwise select one or more image files. For example, a user may not remember where an image file is stored. However, the user may remember that the image file was used in a presentation, emailed, received, emailed, etc., on a date, or an approximate date. According to this example, image files can be searched to identify image files having action tags corresponding to an occurrence of a particular indirect action.

The image files are then organized (1050) or selected (1060) as described herein, according to the specifics of the request provided in 1030. A second request can also be issued and relevant actions tags again compared (e.g. repeating acts 1030 and 1040) to narrow results of the first request and comparison.

A specific indirect action can be performed on image file(s) returned from the request (1070). In this case, appropriate action tag(s) would be added to such file(s) in accordance with the teachings herein to track such use (1080). In other words, the metadata used to select or organize image files can result in the performance of an indirect action that in turn results in the generation of additional metadata.

The indirect action occurrences—and hence the action tagging—described herein can be performed by any of a variety of electronic devices, either at the direction of a user, or in some cases automatically, e.g., automatic periodic backup. The electronic device may be a standalone device, e.g., a computer or printer, or may be part of a system that includes other devices, e.g., a printer in communication with a computer. A computer may be any suitable type, e.g., desk top, lap top or hand-held. The electronic device can include, or have access to, a processing device and/or software that performs the action tagging. Numerous electronic devices that act in some way on data files can perform the action tagging, e.g., printers, scanners, cameras, photo viewers, cell phones, presentation devices, personal digital assistants, conventional and special purpose computers, any device including a print driver, and other electronic devices or any combination thereof. The tagging itself can be carried out using software, firmware, hardware, or any combination thereof in accordance with the teachings herein.

Figure 11:
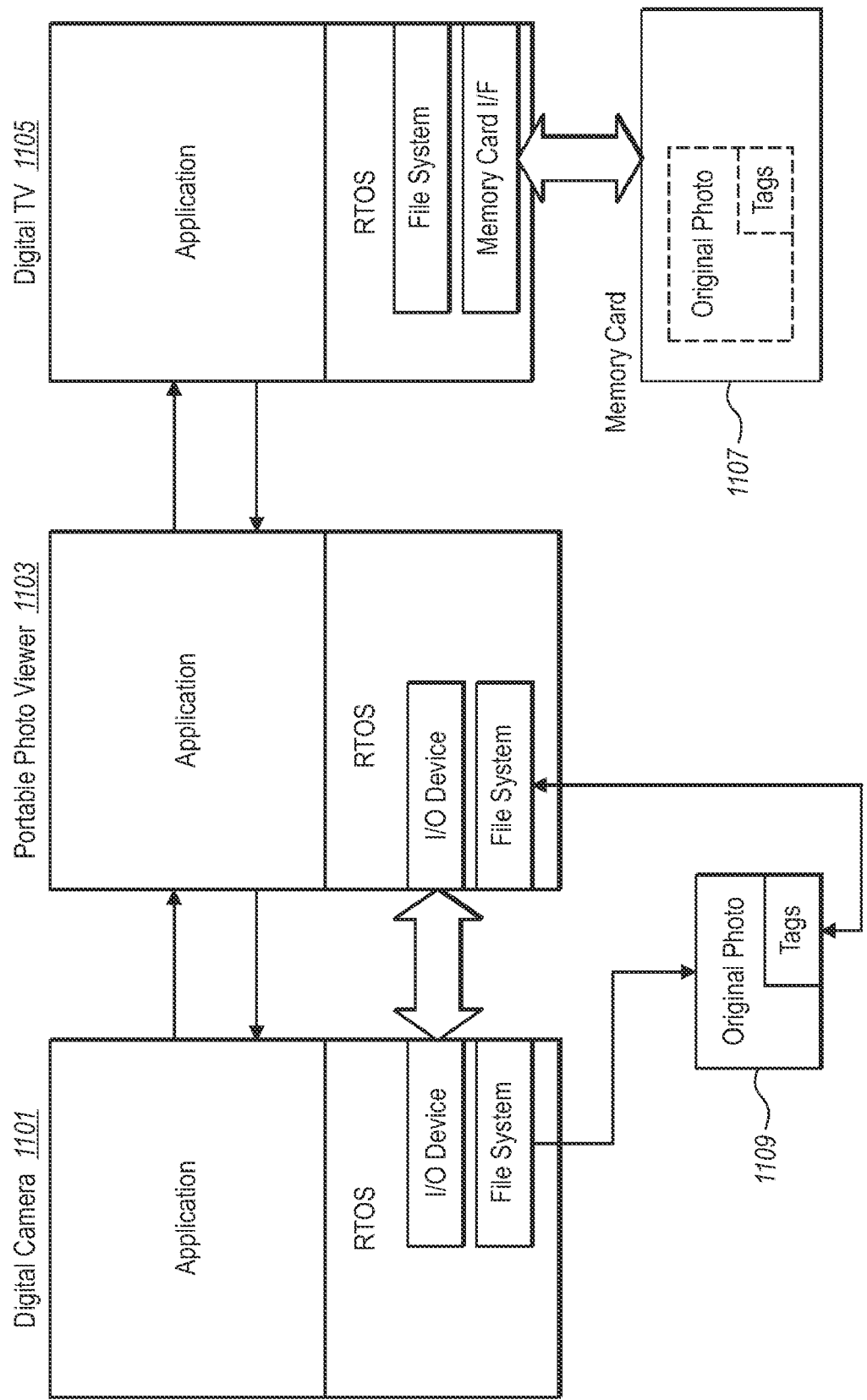
FIG. 11 schematically illustrates a scenario of a data file that is moved among devices and environments.

Moreover, the present invention enables the transfer of action tagged data files between and among various types of electronic devices without loss of the action tag information. In this invention, the action tags are advantageously stored on the data file itself, and preferably in the header space of the data file. Thus, even if the user moves the data file to a different environment, the action tags remain with the file. FIG. 11 schematically illustrates a scenario of a data file that is moved among a digital camera 1101, a portable photo viewer 1103, a digital TV 1105 and a memory card 1107. Each of the digital camera 1101, the portable photo viewer 1103 and the digital TV 1105 includes an image application, an operating system (OS), preferably a real-time OS (RTOS), and a file system. The digital camera 1101 and portable photo viewer 1103 further include an I/O device to enable data transfer. In the exemplary scenario of FIG. 11, in which the data file is a photo 1109, the digital camera 1101 captures an image, which is embodied on photo 1109, and action tags the photo accordingly. The action tag is stored on the photo 1109 and preferably in the header thereof. Subsequently, when the photo 1109 is transferred from the file system of the camera 1101 to the file system of the portable photo viewer 1103, the tag added by the digital camera 1101, and any other action tags added in the interim, are likewise transferred to the viewer 1103. Transfer of photo 1109 from the memory card 1107 to the file system of the digital TV 1105 via its memory card interface (I/F) also includes transfer of the action tags of the photo 1109. In addition to surviving transfer of the data file among devices and platforms, the action tags are also robust against updates or new versions of the application in which the associated data was created.

In addition to enabling the transfer of action tagged data files between and among various types of electronic devices and applications without the loss of action tag information, the present invention also enables synchronization of data file copies when indirect action occurrences are taken on the different copies in different devices or applications during the same time period. For example, if a data file is copied from a database residing on a user's personal computer to another computer, say, a lap top, and further indirect actions are taken both with respect to the original data file and the copied data file, such actions should be synchronized so that both the original and the copy of the data file reflect all of the actions taken on the data file.

FIG. 12 shows a priority table in which each of multiple indirect actions, e.g., print, e-mail, back up and viewing, is identified with the number of occurrences of that action, the last date on which that action occurred and was recorded, and an identification of the particular device type that performed that action. The device type is identified by a code in FIG. 12, and the table of FIG. 13 correlates each code with a particular device type.

Figure 14:
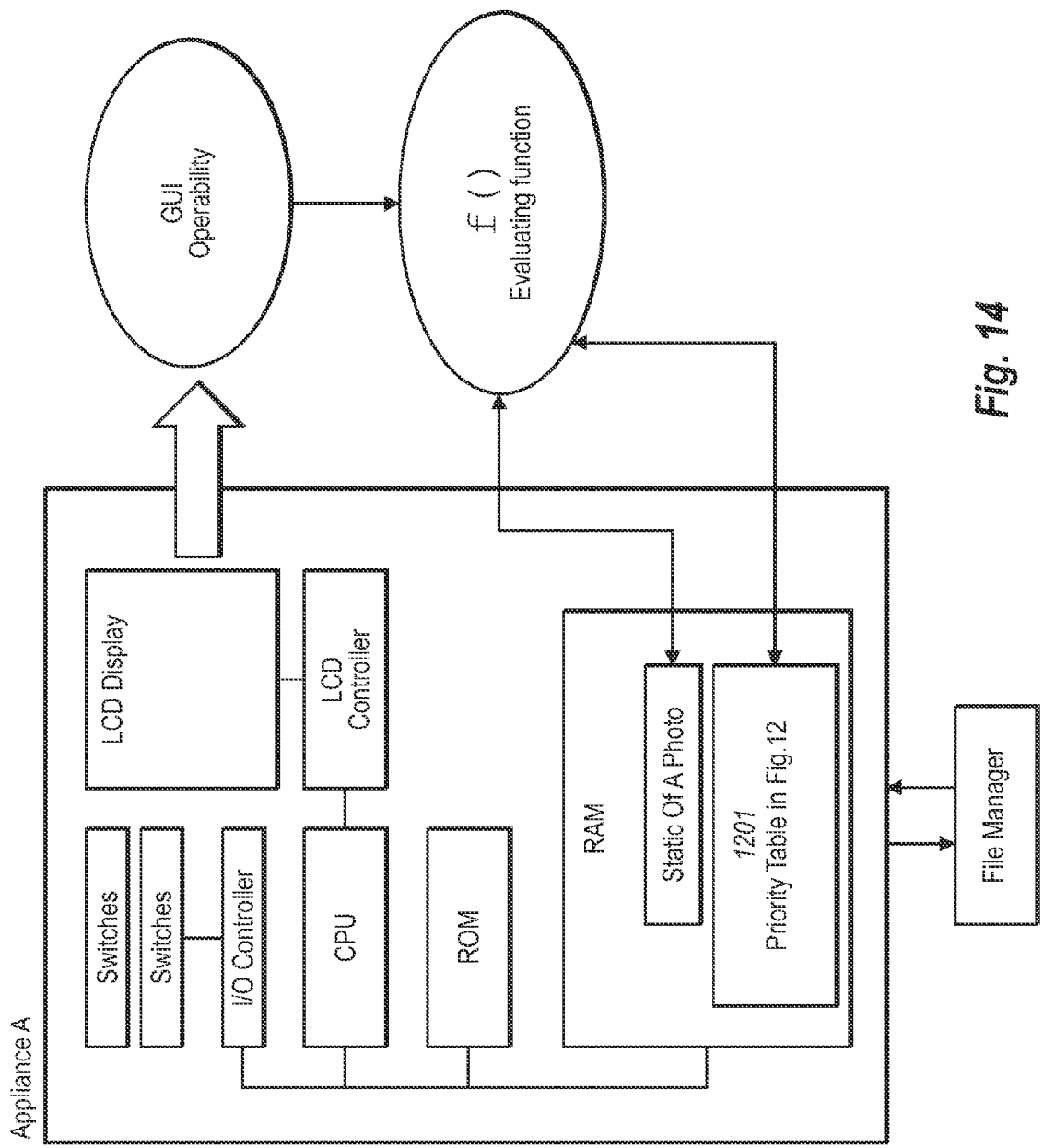
FIG. 14 schematically illustrates a particular device in which aspects of the invention including priority synchronization can be carried out.

FIG. 14 illustrates an exemplary device (Appliance A) comprising, among other components, a RAM in which a data file priority table of the type shown in FIG. 12 is stored. The RAM is in communication with a file manager from which the data file and associated priority table can be fetched. Before a digital file, e.g., a digital photo also stored in RAM, is evaluated by the evaluating function f ( ), it may be necessary to first update the priority table.

Figure 15:
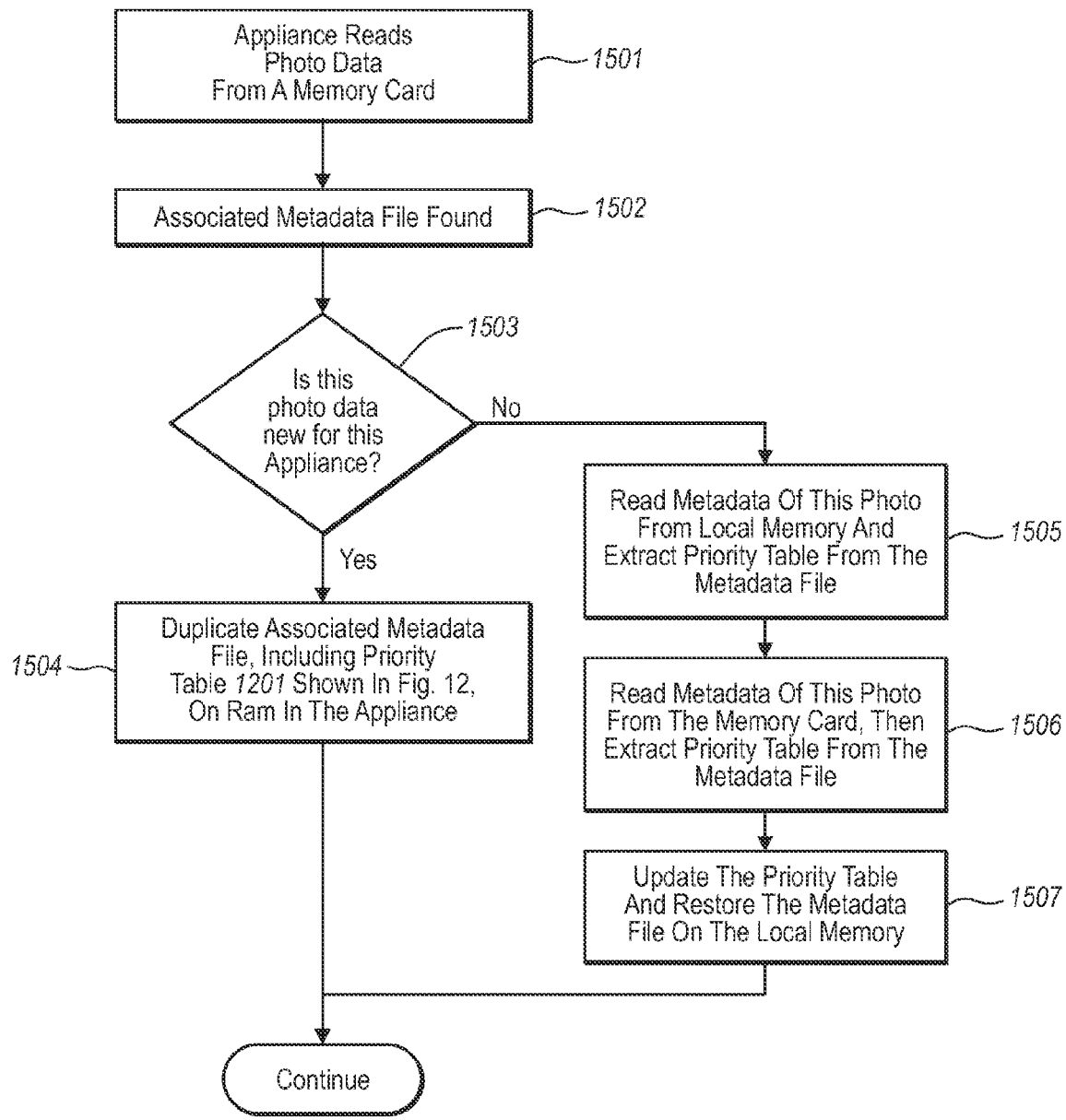
FIG. 15 is a flow diagram showing embodiments of methods for priority synchronizing a data file.

FIG. 15 is a flow chart showing an example of such an updating process according to embodiments of the present invention. In this example, the device (appliance) reads photo data from an external device, e.g., a memory card, in communication with the appliance (1501) and locates the associated metadata file (1502). Then, the appliance determines whether or not this just read photo data is new for the appliance (1503). If so, the associated metadata file, including the priority table stored therein, is duplicated on the RAM of the appliance (1504). If it is determined that the uploaded photo data is not new for the appliance, metadata of this photo is read from local (i.e., the appliance's) memory and the priority table is extracted from that metadata file (1505), and metadata of this photo is also read from the memory card and the priority table extracted from that metadata file (1506). Then, the priority table and metadata in local memory are updated to reflect any actions taken on the photo data while outside the appliance (1507).

Figure 16:
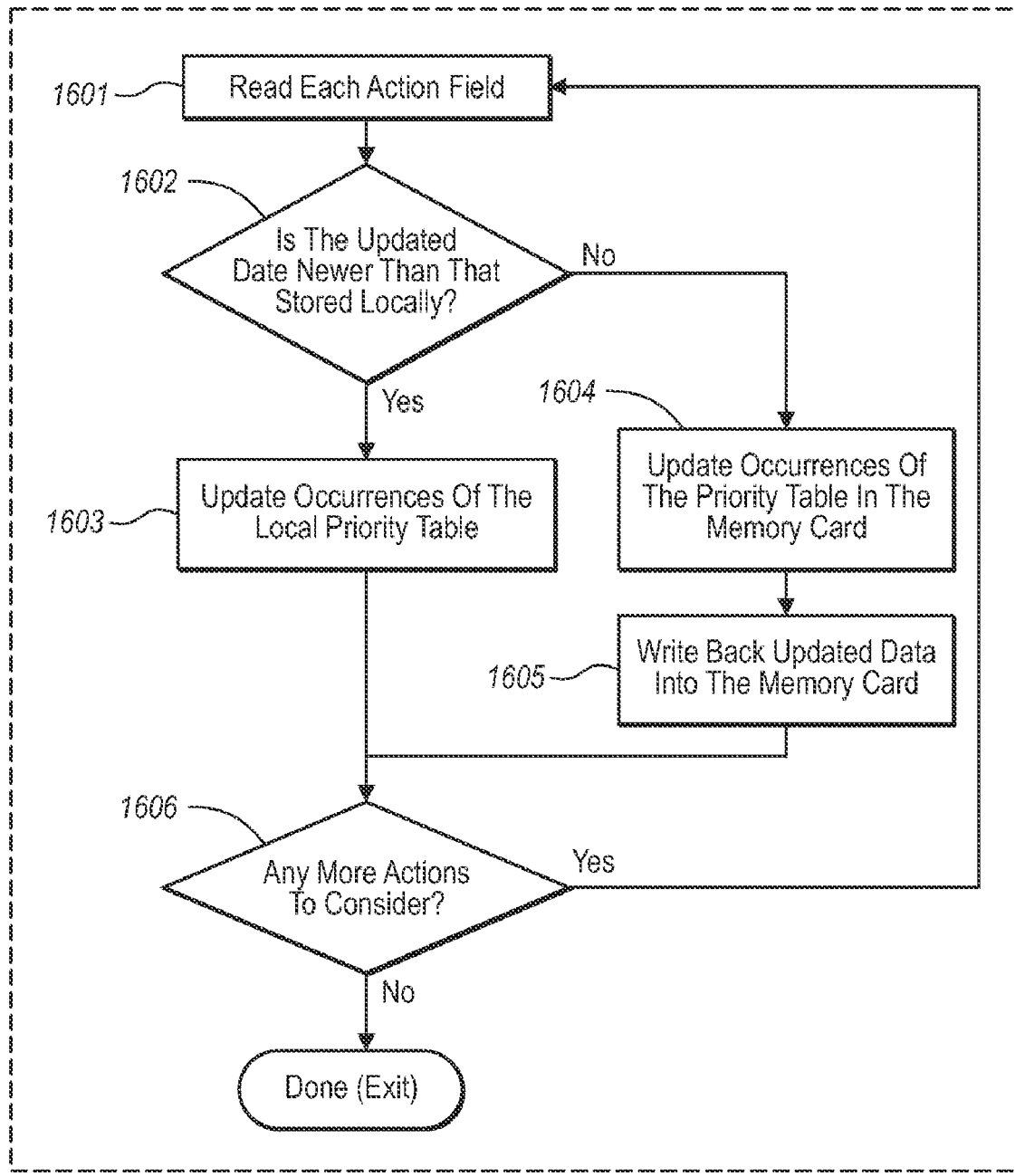
FIG. 16 is a flow diagram showing embodiments of carrying out method action 1507 of FIG. 15.

The process of such updating (1507) is further illustrated in the flow chart of FIG. 16. The process begins by the appliance reading, for a given action, each action field in the priority table of the external device, e.g., memory card (1601). Next, a determination is made as to whether the last updated date for that action is newer than that in the local priority table (1602). If so, the associated occurrence number of the local priority table is updated (1603); if not, the occurrence number of the priority table in the memory card is undated (1604), and the updated data is written back to the memory card (1605). After operation 1603 or 1605, a determination is made as to whether there are any other actions to update (1606). If so, the updating process is repeated for another action, that is, the process returns to operation 1601. If not, the updating process is complete and the therefore ends.

Thus, the invention also provides a way to synchronize actions that occur on different copies of the same data file to reflect the actual use—and hence value—of that file.

Various methods for tagging and also for using the tagged information in a useful way have been described. Any of these methods can be carried out in response to the execution of instructions, which may be in the form of software, hardware, firmware, or some combination thereof, carried or stored on any of a variety of readable media. By way of example, and not limitation, such readable media can include RAM, ROM, EEPROM, CD-ROM, DVD or other optical disk storage, magnetic disk storage, memory cards, such as digital camera memory cards, or other magnetic storage devices, or any other medium, which can carry or store desired program code in the form of executable instructions, and which can be accessed by an electronic device. When information is transferred or provided over a network or another communications connection (either hardwired, wireless, or a combination thereof) to an electronic device, the electronic device views the connection as a readable medium. Thus, any such connection is properly included as a readable medium.

Executable instructions comprise, for example, instructions and data which cause a processing device or other circuitry to perform a certain function or group of functions. An electronic device on which the instructions are executed can include a processor, circuitry, firmware, and/or software configured to perform the acts specified by the instructions, including methods illustrated by FIGS. 9 and 10.

Software can be also created that use the action tags to generate, based on the results of one or more comparative-type analyses, a product, such as an album, website, email, or presentation, for a user. The product can also represent a template for editing by a user. As such, the methods described herein can be combined with such software to offer various additional advantages and products.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes within the meaning and range of equivalency of the claims are embraced within their scope.

We claim:

1. A method for computing a total value of a data file stored in a database of computable readable medium using a computing device capable of executing a series of instructions to perform the following:

detecting a plurality of indirect actions taken with respect to the data file at the time the indirect actions occur, automatically generating and storing as metadata in the data file each occurrence and at least one associated characteristic of each of a plurality of the plurality of indirect actions taken with respect to the data file, wherein the metadata is automatically generated at the time the plurality of indirect actions are detected;

computing at least two input values, one for each of the plurality of indirect actions, each input value being computed for a particular indirect action as a function of at least one parameter; wherein the at least one parameter includes time since the data file was created, time since the last occurrence of a particular indirect action, number of occurrences of a particular indirect action within a unit time, and total number of occurrences for a particular indirect action;

computing a total value for the data file based on the input values each time an indirect action is taken at the time the plurality of indirect actions are detected; and storing the total value for the data file in the metadata of the data file.

2. A method according to claim 1, wherein the data file includes a header and content data, and where the metadata is incorporated into the header.

3. A method according to claim 1, wherein the plurality of indirect actions include printing, copying, viewing, transmitting, receiving, saving, editing, zooming, enhancing, or any subcombination thereof.

4. A method according to claim 1, wherein the at least one characteristic associated with each occurrence of each of a plurality of indirect actions includes one or more of the following: a time of that occurrence, a device associated with that occurrence, a person associated with that occurrence, or a frequency of that occurrence.

5. A method according to claim 1, further comprising assigning a weight to each input value computation, wherein each input value is computed further based on its assigned weight.

6. A method according to claim 1, wherein the computing steps are carried out in response to a search, sort, or organization request with respect to a group of data files including the data file.

7. A data file capable of being stored in a database of computable readable medium connected to a processor capable of executing a series of instructions, comprising
content data;
a header embodying metadata that includes a recording of each occurrence and at least one associated characteristic of each of a plurality of indirect actions taken with respect to the data file which is automatically generated by the processor when the plurality of indirect actions are taken with respect to the data file; and
a weight embodying metadata that includes a total value computed by the processor based on at least two input values computed by the processor, one for each of at least two of the plurality of indirect actions, each input value being computed based on at least one parameter, wherein the total value is computed each time an indirect action is taken at the time the indirect action is taken, wherein the at least one parameter includes time since the data file was created, time since the last occurrence of a particular indirect action, number of occurrences of a particular indirect action within a unit time, and total number of occurrences for a particular indirect action.

8. A data file according to claim 7, wherein the plurality of indirect actions include printing, copying, viewing, transmitting, receiving, saving, editing, zooming, enhancing, or any subcombination thereof.

9. A data file according to claim 8, wherein the at least two input values are used to compute a total value for the data file to be used to organize or sort the data file with respect to other data files.

10. A data file according to claim 8, wherein the at least two input values are used to compute a total value for the data file to be used to search for the data file among other data files.

11. A system for managing data files, comprising:
An interface by which a user sets one or more parameters for sorting or organizing the data files or for searching for at least one data file among the other data files; and
A processor configured to detect a plurality indirect actions taken with respect to each data file at the time the indirect actions occur, automatically generate metadata associated with a data file each time an indirect action is taken with respect to the data file, and compute for each data file, based on the metadata of that data file and one or more set parameters, at least two input values, one for each of at least two of the plurality of indirect actions, the processor being further configured to compute a total value for each data file based on the input values computed for that data file each time an indirect action of the plurality of indirect actions is taken and storing the total value for the data file in metadata of the data file, wherein the at least one parameter includes time since the data file was created, time since the last occurrence of a particular indirect action, number of occurrences of a particular indirect action within a unit time, and total number of occurrences for a particular indirect action.

12. A system according to claim 11, wherein the one or more parameters include one or more of the following: time since the data file was created, time since the last occurrence of a particular indirect action, number of occurrences of a particular indirect action within a unit time, total number of occurrences for a particular indirect action, or different types of indirect actions taken with that data file.

13. A tangible readable medium having instructions stored thereon, the instructions being configured to cause an electronic device to perform the method of claim 1.

14. A tangible readable medium having instructions carried or stored thereon for directing a device to perform the method of claim 1.

15. A method for managing data files capable of being stored in a database of computable readable medium connected to a processor capable of executing a series of instructions, each data file of which includes in the header of that data file metadata recording each occurrence and at least one associated characteristic of each of a plurality of indirect actions taken with respect to that data file at the time the plurality of indirect actions are taken with respect to the data file which is automatically generated by the processor when the plurality of indirect actions are taken with respect to the data file, the method comprising
selecting at least two of the indirect actions and at least one associated characteristic for each indirect action as criteria for managing the data files;
computing a total value based on the at least two of the indirect actions each time the indirect actions are taken using at least one parameter including time since the data file was created, time since the last occurrence of a particular indirect action, number of occurrences of a particular indirect action within a unit time, and total number of occurrences for a particular indirect action;
storing the total value in the metadata of the data files; and
running an, organize, sort, or otherwise manage the data files in accordance with the selection in the header of the data file.

* * * * *